C. KRALICEK.
OILING DEVICE.
APPLICATION FILED FEB. 10, 1919.
1,401,711.
Patented Dec. 27, 1921.
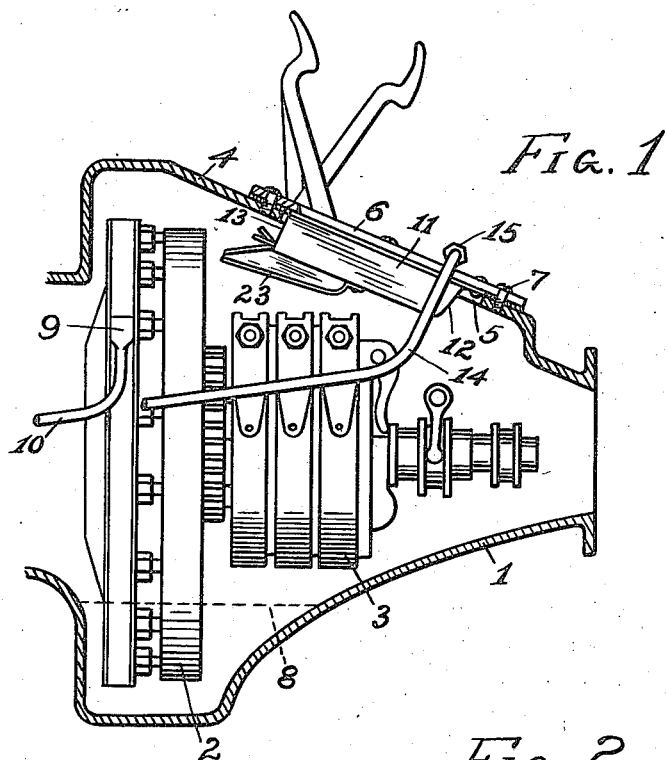
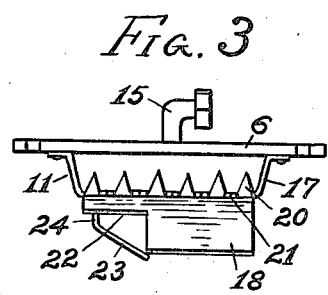
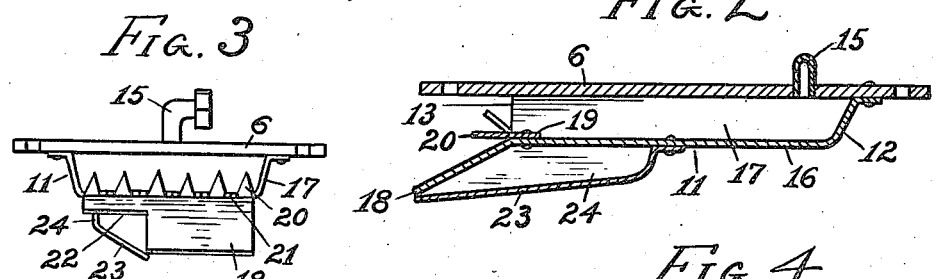
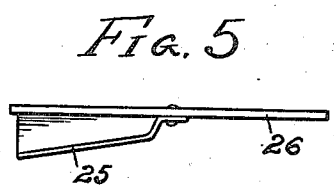
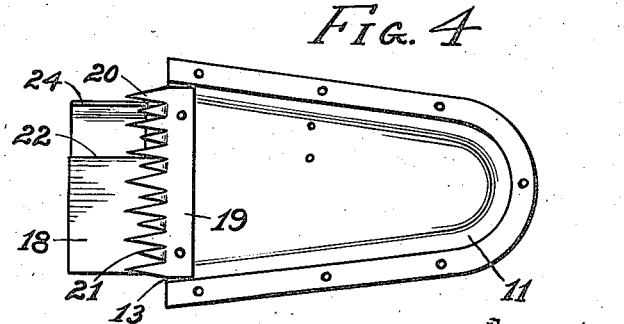
Inventor
Charles Kralicek
By
his Attorney

UNITED STATES PATENT OFFICE.

CHARLES KRALICEK, OF CLEVELAND, OHIO, ASSIGNOR, BY MESNE ASSIGNMENTS, TO SAFETY OILING SYSTEM, INCORPORATED, OF PHILADELPHIA, PENNSYLVANIA, A CORPORATION OF PENNSYLVANIA.

OILING DEVICE.

1,401,711.     Specification of Letters Patent.     Patented Dec. 27, 1921.

Application filed February 10, 1919. Serial No. 275,971.

*To all whom it may concern:*

Be it known that I, CHARLES KRALICEK, a subject of Austria, residing at Cleveland, in the county of Cuyahoga and State of Ohio, have invented certain new and useful Improvements in Oiling Devices, of which the following is a specification.

This invention relates to oiling devices for conveying oil from the rear to the front end of the engine housing of a "Ford" automobile, and more especially to improvements in the oiling device patented to me October 29, 1918, by Letters Patent No. 1,282,872.

The main object of the present invention is to provide said oiling device with suitable means whereby the oil will flow from the open inlet end of the same and to the rear for lubricating the brakes when the automobile is descending a hill.

For a clear understanding of the invention, the same will be hereinafter fully described with reference to the accompanying drawings, and the novel features thereof will be particularly pointed out in the appended claims.

In the drawings similar characters of reference are used to designate corresponding parts.

Figure 1 is a longitudinal sectional view of a part of the engine housing of an automobile with the mechanism therein, and an oiling device constructed in accordance with my invention applied thereto, Fig. 2 is a longitudinal sectional view of the oil catching pan, Fig. 3 is a front end view of the same, Fig. 4 is a plan view of the oil catching pan detached from the cover plate, and Fig. 5 is a longitudinal view of a cover plate with an oil pocket fixed thereto.

Referring to the drawings, 1 represents the rear end of the housing of an automobile engine, which incloses the fly-wheel 2 and the brakes 3. The top of the housing, indicated by 4, is inclined rearwardly, and over the brakes is provided with an opening 5, which is closed by a removable cover plate 6, for permitting access to the mechanism within the housing. Said cover plate is held in place by means of screws 7. The fly-wheel runs in oil to about the level of the dotted line 8, and the rotating of the fly-wheel splashes oil onto the brakes 3, and also into the cup 9. From the cup, the oil is carried by the pipe 10 to the forward end of the engine housing for oiling the crank-shaft bearings and other parts as the oil flows back along the bottom of the housing to the well for the fly-wheel. Owing to the brakes being near the fly-wheel, the threads of fiber wearing off the brake bands, are carried into the cup 9 and soon clog up said cup and pipe, thus preventing proper oiling of the crank-shaft bearings and other revolving parts. This trouble is overcome by the use of my said former invention, but when the automobile is traveling down a hill, the brakes 3 are not lubricated as oil is not splashed up and rearwardly over the brakes as when the automobile is traveling on the level. My present invention added to my former invention provides for the oiling of the brakes when the automobile is traveling down grade.

As in my former invention, a sheet metal pan 11 is fixed in any suitable manner to the underside of the cover plate 6. In the present invention, the pan has a closed rear end 12, and the forward end is open at 13, for receiving the oil as it is carried up and splashed therein by the revolving fly-wheel. Oil is conveyed from the pan 11 to the forward end of the engine housing by means of a pipe 14, which is connected to an elbow 15 threaded in the top side of the cover plate 6. In the present invention, the forward end of the lower side 16 of the pan 11 extends beyond the sides 17 thereof and is inclined downwardly to form a guide plate 18 for more readily receiving the oil into the pan. For preventing particles or threads of fiber, which wear off the brake band linings, entering the open end 13 of the pan, and also for retaining the particles or threads of fiber, a plate 19 having sharp pointed teeth 20 cut therein, and each alternating tooth as 21 being bent upwardly on an inclination, is fixed to the lower side of the pan at its open end. Said teeth prevent the threads of fiber entering the pan and also catch and retain the same as fast as they are produced, thereby preventing their accumulation and winding between the gears thus breaking them. To remove the threads of fiber from said teeth, is easily done after first removing the cover plate 6.

In order to provide for the lubricating of the brakes 3 when the automobile is traveling down grade, and as a consequence, no oil is splashed rearwardly upon the brakes by the fly-wheel, the present invention was devised. It consists of the heretofore mentioned downwardly inclined guide plate 18, a part of which is cut away at one side thereof to leave an opening 22, and an inclined plate 23 having an upwardly extending side 24 is fixed to the lower side 16 of the pan 11, under said opening so as to form with the plate 18 a pocket open at one side for directing oil upon the brakes. The oil having been splashed into the pan 11 when the automobile was traveling upon the level, flows onto the pocket forming plate 23, and thence upon the brakes 3, when the automobile is traveling down a hill.

In Fig. 5, an inclined plate 25, similar to the plate 23, is fixed to the underside of the cover plate 26, instead of the pan 11, and serves the same purpose as herebefore explained.

Having fully described my invention, what I claim is:

1. An oiling device comprising a plate, a pocket carried by the plate, the pocket having an open end for receiving oil, and the pocket having an open side for permitting oil to flow therefrom, substantially as described.

2. An oiling device comprising a plate, a pocket carried by the plate, the plate and pocket being arranged on an inclination, the pocket having an open end for receiving oil, and the pocket being provided with an open side for permitting oil to flow therefrom, substantially as described.

3. An oiling device comprising a pan having an open end for receiving oil, a pocket, the pan having an opening into the pocket, and the pocket being provided with an opening along its side for permitting oil to flow therefrom, substantially as described.

4. An oiling device comprising a pan having an open end for receiving oil, the pan having a side projecting beyond its open end, the projecting side beyond the open end being inclined downwardly and having an opening, and a plate covering the opening for receiving oil from said pan and directing the flow of the same, substantially as described.

5. An oiling device comprising a pan having an open end for receiving oil, the pan having its underside projecting beyond the open end, the projecting side beyond the open end being inclined downwardly and having a part thereof cut away to provide an opening, a plate fixed to the pan under the opening, and the plate being inclined laterally for directing the flow of the oil received from said pan, substantially as described.

6. An oiling device comprising a pan having an open end for receiving oil, the pan having a side projecting beyond its open end, the projecting side beyond the open end having an opening, a plate fixed to the pan under the opening, the plate having an upwardly extending side and being inclined laterally with relation to said side of the pan for directing the flow of the oil received from said pan, substantially as described.

In testimony whereof I affix my signature.

CHARLES KRALICEK.